US007660083B2

(12) United States Patent
Yao et al.

(10) Patent No.: US 7,660,083 B2
(45) Date of Patent: Feb. 9, 2010

(54) ELECTROMECHANICAL AND SOLID-STATE AC RELAY WITH REDUCED ARCING

(75) Inventors: Li Yao, Shanghai (CN); Shu Peng Chen, Shanghai (CN); Yong Wei, Shenzhen (CN)

(73) Assignee: Pericom Technology Inc., Shanghai (CN)

( * ) Notice: Subject to any disclaimer, the term of this patent is extended or adjusted under 35 U.S.C. 154(b) by 365 days.

(21) Appl. No.: 11/834,104

(22) Filed: Aug. 6, 2007

(65) Prior Publication Data

US 2008/0048807 A1 Feb. 28, 2008

(30) Foreign Application Priority Data

Aug. 25, 2006 (CN) .................... 2006 2 0045110 U

(51) Int. Cl.
*H02H 3/00* (2006.01)
*H02H 7/00* (2006.01)

(52) U.S. Cl. ....................... 361/8; 361/2; 361/3; 361/4; 361/5; 361/6; 361/7; 361/13; 361/100; 361/139; 361/160; 361/206; 361/209; 335/12; 335/13; 335/99; 335/201; 335/231; 335/238; 335/243; 335/169; 335/199; 307/134; 218/8; 218/143; 218/144; 218/145

(58) Field of Classification Search ............. 335/12–13, 335/99, 169, 199, 201, 231, 238, 243; 361/2–8, 361/13, 100, 139, 160, 206, 209; 307/134; 218/8, 143–145
See application file for complete search history.

(56) References Cited

U.S. PATENT DOCUMENTS

| | | | | | |
|---|---|---|---|---|---|
| 3,491,284 | A | * | 1/1970 | Pascente | 323/319 |
| 3,783,305 | A | * | 1/1974 | Lefferts | 361/13 |
| 3,868,549 | A | * | 2/1975 | Schaefer et al. | 361/13 |
| 4,074,333 | A | * | 2/1978 | Murakami et al. | 361/13 |
| 4,152,634 | A | * | 5/1979 | Penrod | 318/739 |
| 4,307,327 | A | * | 12/1981 | Streater et al. | 318/786 |
| 4,725,911 | A | * | 2/1988 | Dieppedalle et al. | 361/8 |
| 4,855,612 | A | * | 8/1989 | Koga et al. | 307/140 |
| 5,283,706 | A | * | 2/1994 | Lillemo et al. | 361/3 |
| 6,621,668 | B1 | * | 9/2003 | Sare | 361/13 |
| 6,969,927 | B1 | * | 11/2005 | Lee | 307/32 |
| 2002/0171983 | A1 | * | 11/2002 | Brooks, Jr. | 361/2 |
| 2007/0014055 | A1 | * | 1/2007 | Ness | 361/2 |

* cited by examiner

*Primary Examiner*—Elvin G Enad
*Assistant Examiner*—Mohamad A Musleh
(74) *Attorney, Agent, or Firm*—Stuart T. Auvinen; gPatent LLC

(57) ABSTRACT

An electromechanical/solid-state AC relay has an electromechanical winding coil that moves an armature to force mechanical contacts to open or close. Electrical arcing across the mechanical contacts that occur as the contacts are opening or closing can damage and severely reduce the lifetime of the relay. Contact arcing is prevented by pulsing a triac on for a short period of time just before and after the mechanical contacts make or break contact. The triac limits the voltage difference across the mechanical contacts to less than one volt to prevent arcing. The triac is turned off after the mechanical contacts finish moving, reducing the heating and average power through the triac. A zero-sampling circuit that detects when the AC input voltage switches across 0 volts and activates a control integrated circuit to switch on the triac during zero-crossings to minimize power surges.

19 Claims, 4 Drawing Sheets

ELECTROMECHANICAL AND SOLID-STATE AC RELAY WITH REDUCED ARCING

RELATED APPLICATION

This application claims the benefit under 35 USC § 119 of the co-pending application for "AC Relay", China App. No. 200620045110.0, filed Aug. 25, 2006.

FIELD OF THE INVENTION

This invention relates to alternating-current (AC) relays, and more particularly to AC relays with both mechanical and solid-state contacts.

BACKGROUND OF THE INVENTION

A relay is a type of electronic control device that often used as an automatic control circuit. It has a control system (also known as the input circuit) and a controlled system (also known as the output circuit). A smaller current in the control system can control a larger current of the controlled system using such an "Automatic Switch."

While simple direct current (DC) relays are common, alternating-current (AC) relays may be somewhat more complex since the AC current switches direction. However, many commercial appliances use AC and thus could benefit from an AC relay to control the AC current that powers the appliance. Electric irons, toasters, and other small electronic appliances can benefit from the use of improved AC relays. The improved AC relays can increase reliability and precision of temperature control for such appliances.

Current products commonly use electromagnetic relays (EMR) and solid state relays (SSR). Electromagnetic relays (EMR) use a mechanical contact switch. The contact resistance and power dissipation of an EMR is very small. However, EMR's have some drawbacks.

The process of switching an EMR may take a few milliseconds to a few tens of milliseconds. When AC current is used, it is difficult to turn the EMR on and off at the zero-crossing of the AC current, when the AC current switches direction. Also, the mechanical contact in the EMR might arc, producing a reduced contact lifetime. EMR's also have a large electromagnetic interference (EMI).

The stochastic operation time causes the EMR to be incapable of turning on or turning off at exactly the load's AC zero crossing. Instead, the electromagnetic relay's switching action brings a surge current. This surge current creates interference in the electrical grid system, producing an inextricable EMI problem for the electromagnetic relay.

Usually an arc discharge phenomena appears at the moment of switching, when the electromagnetic relay controls a high voltage and a large current flows. An electric spark (arc) appears, and the arc discharge creates electrical wear. This electrical wear is much worse than the mechanical wear on the EMR, producing an electrical lifetime that is far less than the mechanical lifetime of the EMR. Usually the electrical lifetime is about fifty to one hundred thousand times, but the mechanical lifetime is over one million times.

Solid state relays use a solid-state semiconductor such as a Silicon-Controlled-Rectifier (SCR) for the switch function. SCR's produce no arcing and no large electromagnetic interference. However, SCR's operate with about a 1-Volt voltage drop. This 1-volt drop through the SCR is a serious problem, especially for high-power control applications.

Simply combining an electromechanical EMR relay with a solid-state relay (SSR) would likely produce the disadvantages of both. The combined device could have low reliability due to arcing of the EMR, and have the voltage-drop problem of the SSR, along with a high cost.

What is desired is an AC relay that combines the benefits of an electromechanical relay and a solid-state relay while reducing or eliminating the disadvantages of each. A relay that switches AC currents near the AC zero-crossing point is desirable. An AC relay that solves the problems of electromagnetic interference (EMI) and high power dissipation when switching large AC currents is also desirable.

DETAILED DESCRIPTION

The present invention relates to an improvement in AC relays. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized the desirability of a solution to the technical problem of the low reliability of electromechanical relays caused by arcing of the mechanical contacts, and the 1-volt drop of the solid-state relay.

The electromagnetic relay usually has an iron core, a winding coil, an iron armature, a movable spring with movable contacts, and so on. As long as both ends of the coil are within a certain voltage, the coil will conduct a certain flow of current, resulting in electromagnetic effects. The iron armature is attracted by this electromagnetic force from the coil. The electromagnetic force overcomes a return force of a spring, or the force of air suction in a core.

Static or dynamic contacts can be normally opened or normally closed by a spring or by air suction. When the coil voltage is removed, the electromagnetic force disappears, and the iron armature is returned to its original position by a spring or air suction. A pull-release thus turns on or cut offs the circuit.

The contact resistance of the metallic contact points is very small. Therefore the electromagnetic relay often is suitable for high-power control applications. The electromagnetic relay depends on a mechanical operation, so it needs some time to turn on or off. This action time is the relay's operation time. Usually the electromagnetic relay operation time for turning on or off is about 5 ms to 30 ms.

The solid state relay (SSR) is a type of switch component with no moving parts, having all solid-state electric parts. The SSR uses the switching characteristic of a bidirectional thyristor to turn on and off currents without mechanical contacts that physically touch and spark. An AC solid-state relay can use a zero-crossing trigger, producing little EMI interference, and can be used safely for computer output interface.

However, when the solid-state relay turns on, there is a voltage drop of about 1 Volt. When large currents pass through the solid-state relay, internal heating and power dissipation of the solid state relay can be large, producing a very serious problem. The price of a large, high-power solid-state relay is very high.

Figure 1:
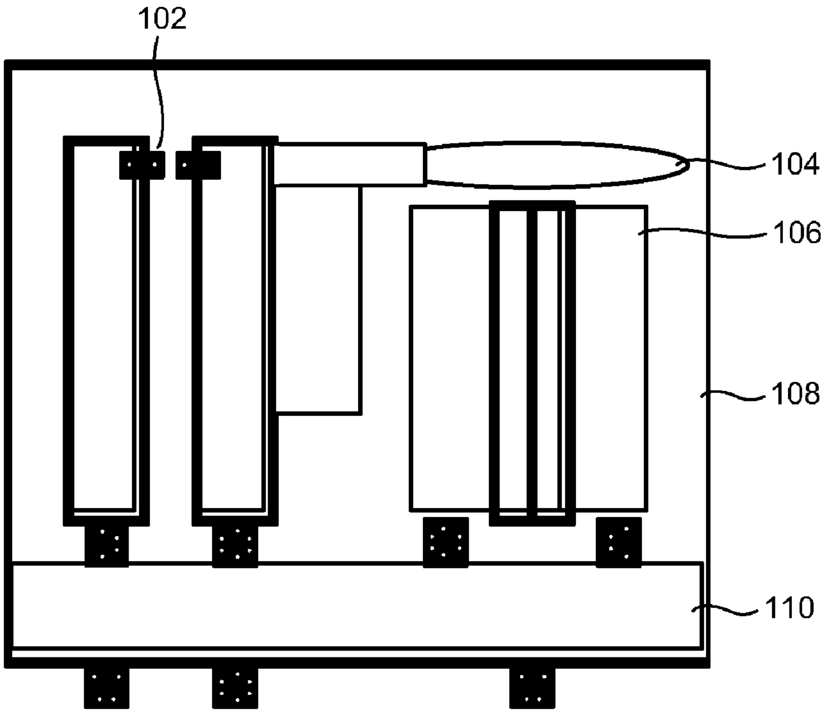
FIG. 1 shows a side view of an electromechanical/solid-state AC Relay that combines the benefits of an EMR and a SSR while reducing the drawbacks of each.

FIG. 1 shows a side view of an electromechanical/solid-state AC Relay that combines the benefits of an EMR and a SSR while reducing the drawbacks of each. Shell 108 encloses both electromechanical and solid-state relay elements.

Mechanical contact 102 is part of an electromechanical device that opens and closes in response to movement of iron armature 104. Winding coil 106 creates the electromagnetic force that moves iron armature 104, causing mechanical contact 102 to make or break electrical connection. Thus an EMR relay coil and contact are enclosed by shell 108.

Control circuit 110 is also integrated within relay Shell 108. Control circuit 110 contains much of the circuitry shown later in FIGS. 3-4.

Figure 2:
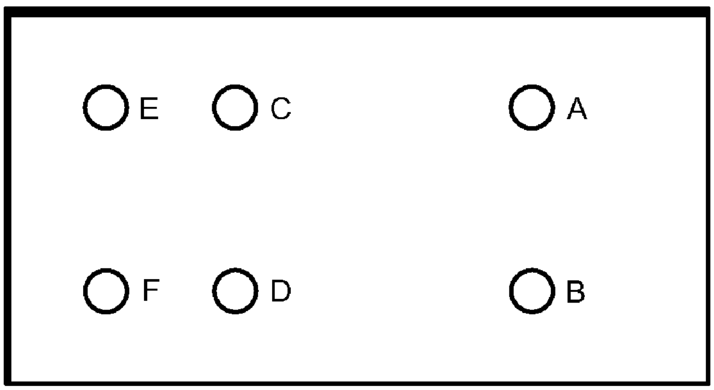
FIG. 2 shows a bottom view of the electromechanical/solid-state AC relay of FIG. 1.

FIG. 2 shows a bottom view of the electromechanical/solid-state AC relay of FIG. 1. Overall, the AC relay is a 6-port device with four input ports A, B, C, D and two output ports E and F. The load is connected at the two output ports E and F. The load has it's AC current switched by the AC relay.

A control signal is applied to the A, B ports. This control signal on the A, B ports controls the E, F output ports.

An AC input is applied to the C, D port. This AC input on the C, D port is connected to the E, F output port when the control signal indicates "turn on". Thus the AC output load on the E, F ports is driven on from power supplied by the C, D ports.

The control signal applied to the A, B ports, controls connecting together the D and F ports to "turn on" or "turn off", and achieve the "On/off" function. When the control signal indicates "turn on", port D is connected to port F. When the control signal indicates "turn off", port D is disconnected from port F.

The function of the coupling circuits is to form a conducting channel between input ports C, D and output ports E, F in response to the "turn on" input control signal at the A, B ports, and to cut off the electrical contact between input D and output port F when the control signal is in the "turn off" state. In the "turn off" state, output ports do not affect input ports.

An AC ground or other AC common voltage can be connected to ports C and E. Thus ports C, E can be the same port. The AC relay could be regarded as a 5-port component rather than a 6-port component.

Figure 3:
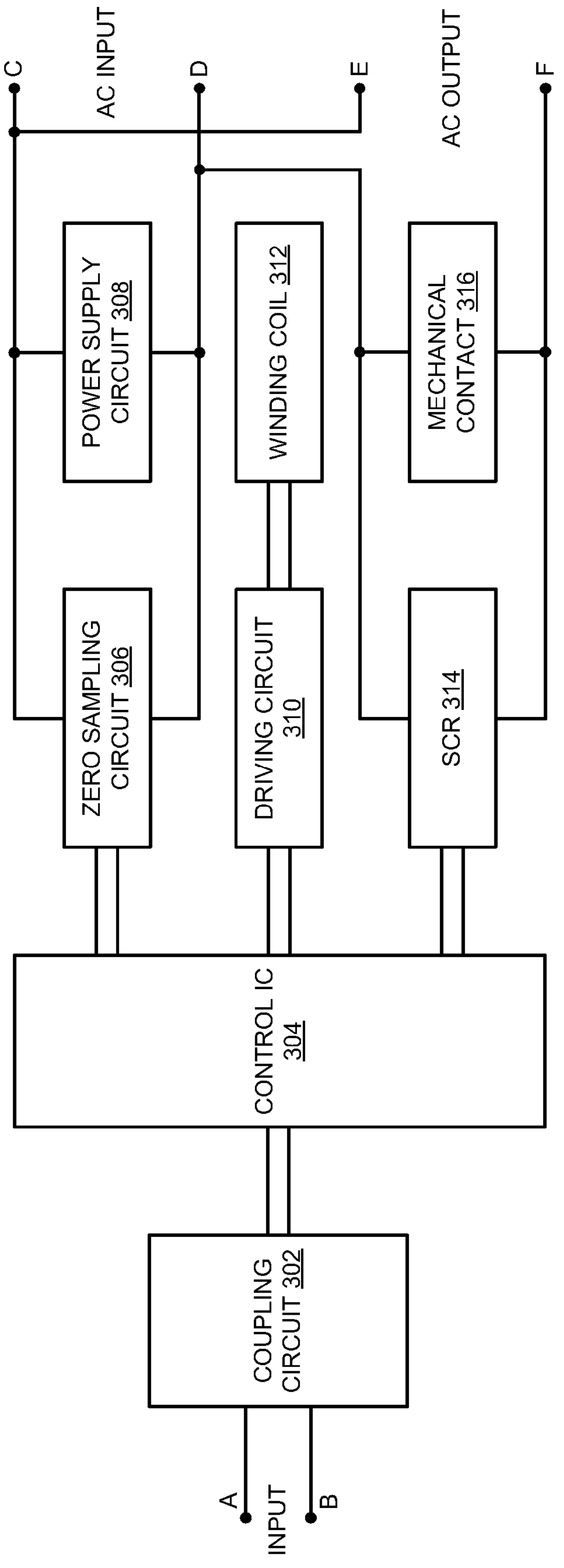
FIG. 3 is a block diagram of the electromechanical/solid-state AC relay.

FIG. 3 is a block diagram of the electromechanical/solid-state AC relay. Components on control circuit 110 (FIG. 1) include coupling circuit 302, control IC 304, zero sampling circuit 306, power supply circuit 308, driving circuit 310, and triac 314. Triac 314 can be a pair of back-to-back SCR'S, a TRIAC (TRIode for Alternating Currents), a thyristor, or similar components.

The control signal is applied to control input terminals A and B. An AC input is applied to the two AC input terminals C and D. The AC output terminals E and F are connected to an AC load, such as the AC circuit to be switched on and off by the control signal.

Coupling circuit 302 is connected to control input terminals A, B and drives the input terminal of control IC 304. Zero-sampling circuit 306 and power-supply circuit 308 are connected to the two AC inputs C, D in parallel. The zero-crossing output signal terminal from zero-sampling circuit 306 is connected to the zero-crossing input signal terminal of control IC 304.

Control IC 304 generates a control signal to driving circuit 310, which drives winding coil 312. Winding coil 312 then moves the iron armature to force mechanical contact 316 into the open or closed position. Winding coil 312 connects to both of the output terminals of driving circuit 310.

Triac 314 and mechanical contact 316 connect in parallel to AC input terminal D and to AC output terminal F. Triac 314 and mechanical contact 316 switch on and off to selectively connect and disconnect terminal F from terminal D. The gate terminal of Triac 314 is directly controlled by control IC 304 while mechanical contact 316 is indirectly controlled by control IC 304, through driving circuit 310 and winding coil 312.

The AC input terminal C connects to the AC output terminal E. Terminals C, E can carry a common AC ground or other common AC signal.

Under normal working conditions, a control signal applied to the A, B ports can control the D, F ports of "turn on" or "turn off", achieving the "On/off" function of the AC relay.

Figure 4:
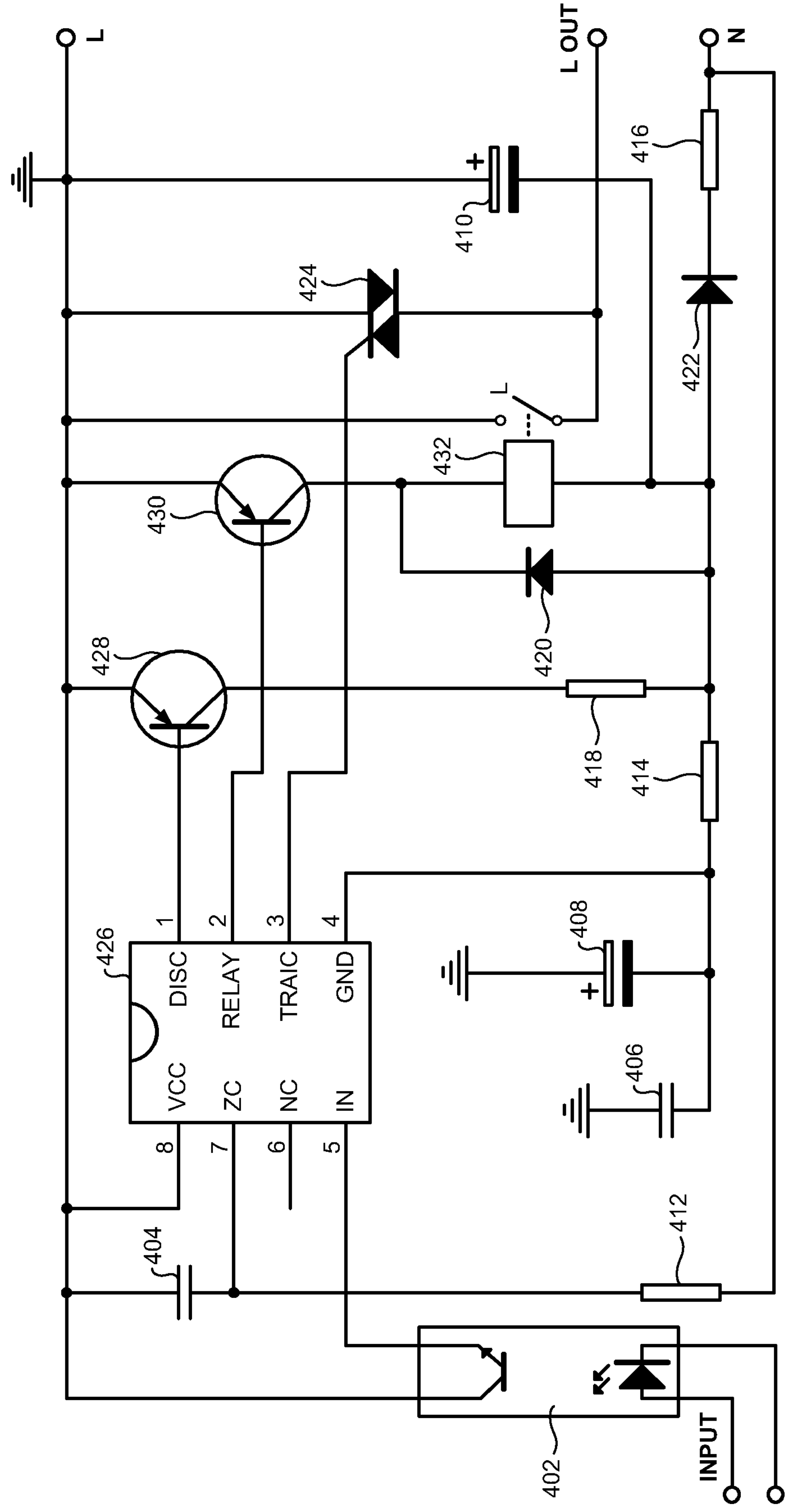
FIG. 4 is a circuit schematic diagram of the electromechanical/solid-state AC relay.

FIG. 4 is a circuit schematic diagram of the electromechanical/solid-state AC relay. Optoelectronic-coupler 402 optically connects the control signal on inputs A, C to input terminal IN of control IC 426. Optoelectronic-coupler 402 is sensitive, has a high response speed, and provides excellent voltage isolation. The input port of optoelectronic-coupler 402 has a good match with the input signal because the load of the input port is often an LED. Thus optoelectronic-coupler 402 can connect to a computer's output interface directly.

AC input L connects to optoelectronic-coupler 402, to the Vcc power-supply input of control IC 426, to the emitters of transistors 428, 430, to triac 424, and to capacitors 404, 410. Coil 432 controls connection of mechanical contacts between terminals L and L-OUT (D and F of FIG. 3) in response to the RELAY output from control IC 426, which turns on the base of transistor 430 to drive current through coil 432. Diode 420 protects coil 432 from damage.

Triac 424 is turned on and off by the TRIAC output from control IC 426, which is directly connected to the gate of triac 424. When triac 424 turns on, current can flow between L and L-OUT in parallel with the currents through the mechanical contacts controlled by coil 432. Thus both mechanical contacts and triac 424 provide the relay's switched currents.

The power circuits include simple resistance/capacitance drop voltage circuits and a power regulator built-in to control IC 426. The power circuits are simple and dependable. Resistors 414, 416, capacitor 406, 408, 410 and diode 422 perform power-supply and other functions. Resistor 418 limits power current through transistor 428 to maintain a constant voltage difference across capacitor 410 when control IC 426 switches its discharge DISC signal. Terminal N is an AC ground or other common AC voltage line.

When the control signal is detected from optoelectronic-coupler 402, control IC 426 samples its zero-crossing (ZC) input, which is a voltage generated by capacitor 404 and resistor 412 that are in series between the AC input terminal L and the AC common terminal N (ports D, C of FIG. 3).

When the AC zero-crossing is detected by control IC 426, control IC 426 drives its TRIAC output to triac 424 to turn it on during the zero-crossing of the AC voltage. Then control IC 426 drives its RELAY output, turning on transistor 430 which turns on winding coil 432 which closes the mechanical contact points, connecting L to L-OUT.

Control IC 426 later turns off its TRIAC output and triac 424, depending on the mechanical contact controlled by coil 432 to drive the load current between L and L-OUT.

When the control signal at optoelectronic-coupler 402 is de-asserted into the "turn off" state, control IC 426 again turns on its TRIAC output, turning on triac 424 and turning off winding coil 432 to open the mechanical contact point. Then control IC 426 turns off its TRIAC output and triac 424 during the zero-crossing of the AC voltage. Thus control IC 426 produces a series of actions.

Figure 5:
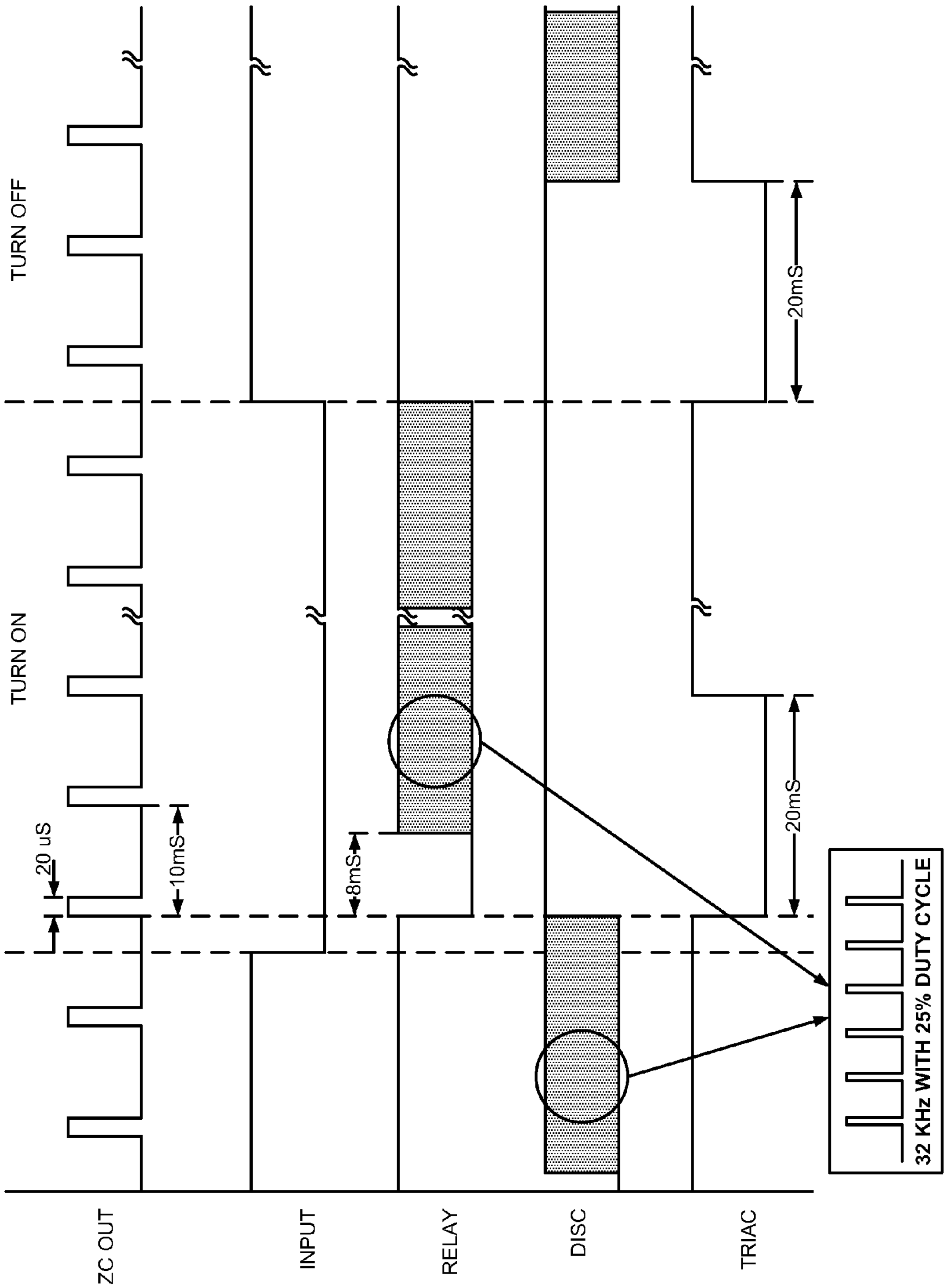
FIG. 5 is a timing diagram of operation of the electromechanical/solid-state AC relay of FIGS. 1-4.

FIG. 5 is a timing diagram of operation of the electromechanical/solid-state AC relay of FIGS. 1-4. The control input signal on ports A, B switches low to signal the electromechanical/solid-state AC relay to "turn on" and close the mechanical contacts. Later in this diagram control input signal on ports A, B switches high to signal the electromechanical/solid-state AC relay to "turn off" and open the mechanical contacts.

When the control input INPUT goes low, the control IC needs to switch on the load. However, rather than immediately switch on the triac and the electromechanical winding coil, the control IC waits for the next zero-crossing of the AC input on ports C, D, which is indicated by the pulses of zero-crossing signal ZC-OUT. When the ZC signal pulses high, the control IC turns on both the triac and the winding coil. Thus both the triac and the winding coil are turned on at the next AC zero-crossing by the control signal activating (driving low) its RELAY and TRIAC outputs.

The triac switches on immediately, but the winding coil is a mechanical device that needs time move the armature, about 5 ms to 15 ms. Once the mechanical contact point closes, the triac has already been operating for several milliseconds and has reduced the voltage difference between the D, F terminals to about 1 volt, the voltage drop through the triac.

Thus when the mechanical contacts eventually close, the voltage between the mechanical contact points is limited to about 1 Volt, which is the voltage drop of the triac. Dangerous surge currents cannot be produced and the electric arcs cannot appear, since the voltage difference is limited to only 1 volt. After the mechanical contact point closes, there is no voltage drop between the terminals of the triac, so the triac has no power dissipation. Thus the problems of the solid-state relay—the power dissipation and 1-volt drop of the triac—are eliminated by the inventors' timing of operation of the triac and the winding coil.

When the control input INPUT goes high, the control IC needs to turn off the load. The control IC immediately drives its RELAY output high, but there is a delay of 5-15 ms for the driver circuits to turn off the winding coil and physically move the armature and open the mechanical contacts. The control IC also immediately drives its TRIAC output low to turn on the triac immediately. Both the triac and the mechanical contacts now conduct the AC current. The triac turns on at the same time that the mechanical contact points are opening.

The control IC keeps the triac on for 20 ms before turning off the triac. The mechanical contact points move apart within 15 ms, so the triac carries the AC current once the mechanical contacts move apart.

When the mechanical contact points open, the voltage between the contacts is just the voltage drop of the triac, which is limited to 1 volt. The arc discharge phenomena cannot be produced. After 20 ms the control IC drives its TRIAC signal high to turn off the triac. The control IC can wait to turn off the triac until the next AC zero-crossing, so the surge currents cannot be produced and interference with the electricity grid system is eliminated. The system achieves the zero-cross triggering.

The RELAY and DISC signals can be pulsed at 32 KHz with a 25% duty cycle as shown for power savings or other purposes. Pulsing the RELAY signal reduces current through winding coil 426 to prevent burnout or other damage to the coil.

ALTERNATE EMBODIMENTS

Several other embodiments are contemplated by the inventors. For example additional resistors and capacitors and other components may be added at various locations for various purposes. Various sizes or values of the components may be substituted. The time periods may differ from the examples shown.

Optoelectronic-coupler 402 could be a PC3H2 type; control IC 304 could be an integrated circuit of the PS8A0201 type; zero sampling circuit 306 may use a triode of the 2N5401 type; driving circuit 310 may use a triode with a 2N5401 type; triac 314 may be a BT134 type. Optoelectronic-coupler 402 can be universal optoelectronic-coupling component. Transistors or triodes can be universal triodes; they also can be integrated into the control IC. Other component types could be substituted.

The winding coil and mechanical contacts may be normally open or normally closed. A spring or an air cushion or suction may be used for the recoil force. The movable arm or armature can have many shapes and may move in a straight line or in an arc or pivot or in other degrees of motion.

The triac can be activated during AC zero-crossings when both making and breaking contact, or only when making contact. When breaking contact, the triac can be turned on at any time since the mechanical contacts are initially closed and carry most of the AC current. The triac may have an on voltage of 1 volt or less, such as 0.7 volt or 0.5 volt, depending on the technology and construction of the triac.

The AC "ground" or common may be any reference voltage and does not necessarily have to be zero volts. For example, a high voltage may be designated as an AC common signal, and the sine waves or other AC waves have voltages below ground. The zero crossing refers to a middle voltage between the high and low peaks and troughs of the AC wave when the direction of current flow reverses. The middle voltage could be exactly midway between the highest and lowest voltages, or could be some other intermediate voltage. Zero-detection does not have to be exact to be effective, but could have some margin of error such as 10%. The AC waves could be sine waves or could have other wave shapes, and could operate at 60 Hz or at some other value.

The background of the invention section and other sections may contain background information about the problem or environment of the invention rather than describe prior art by others. Thus inclusion of material in the background section and other sections is not an admission of prior art by the Applicant.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An electromechanical/solid-state alternating-current (AC) relay comprising:

an AC input that receives a continuous alternating-current signal;

a control input that indicates a turn-on state and a turn-off state;

an AC output that outputs an AC signal in response to the control input being in the turn-on state;

mechanical contacts coupled between the AC input and the AC output;

a movable arm that moves the mechanical contacts into a closed position that connects the AC input to the AC output, and that moves the mechanical contacts into an open position that disconnects the AC input from the AC output an AC common line;

a winding coil that generates an electromagnetic force that moves the movable arm;

a driver circuit, receiving a relay signal, that drives current through the winding coil in response to the relay signal;

a triac coupled between the AC input and the AC output in parallel with the mechanical contacts, the triac having a gate input;

a zero-sampling circuit coupled to the AC input, for generating a zero-crossing signal when the AC input switches direction of current flow; and a control circuit, responsive to the control input and receiving the zero-crossing signal, for driving an activating signal onto the gate input of the triac when the zero-crossing signal indicates detection of the AC input switching direction of current flow after the control input switches into the turn-on state, and for activating the relay signal to the driver circuit so that the mechanical contacts move into the closed position after the triac is activated to conduct current to the AC output wherein the zero-sampling circuit comprises: a zero-detect capacitor coupled between the AC input and a zero-crossing signal input to the control circuit; and a zero-detect resistor coupled between the zero-crossing signal input to the control circuit and the AC common line;

wherein the control circuit drives a de-activating signal onto the gate input of the triac after the mechanical contacts have moved into the closed position, whereby arcing across the mechanical contacts when moving into the closed position is prevented by first activating the triac when the AC input switches direction of current flow.

2. The electromechanical/solid-state alternating-current (AC) relay of claim 1 further comprising:

an optoelectronic-coupler that optically couples the control input to the control circuit;

wherein the optoelectronic-coupler electronically isolates the control input from the control circuit.

3. The electromechanical/solid-state alternating-current (AC) relay of claim 2 wherein the AC common line connects to a second AC input terminal and to a second AC output terminal and to the zero-sampling circuit.

4. The electromechanical/solid-state alternating-current (AC) relay of claim 3 further comprising:

a power supply circuit coupled between the AC common line and the AC input, the power supply circuit generating power to the control circuit and to the driver circuit.

5. The electromechanical/solid-state alternating-current (AC) relay of claim 4 wherein the driver circuit comprises:

a driver transistor having a control node driven by the relay signal from the control circuit, the control node controlling current flow between the AC input and the winding coil.

6. The electromechanical/solid-state alternating-current (AC) relay of claim 4 further comprising:

a discharge transistor having a discharge control node driven by a discharge output of the control circuit, the discharge control node controlling current flow between the AC input and the power supply circuit;

wherein the control circuit discharges the power supply circuit from the AC input using the discharge transistor.

7. The electromechanical/solid-state alternating-current (AC) relay of claim 6 wherein the control circuit activates the discharge transistor to discharge the power supply circuit when the control input is in the turn-off state and the control circuit has driven the de-activating signal to the triac.

8. The electromechanical/solid-state alternating-current (AC) relay of claim 7 wherein the control circuit drives the discharge output with a pulsed signal.

9. The electromechanical/solid-state alternating-current (AC) relay of claim 8 wherein the control input drives the relay signal with the pulsed signal after an initial period of time from activating the relay signal to the driver circuit, wherein the relay signal is driven with the pulsed signal after the initial period of time.

10. The electromechanical/solid-state alternating-current (AC) relay of claim 9 wherein the pulsed signal is a 32 KHz signal.

11. The electromechanical/solid-state alternating-current (AC) relay of claim 9 wherein the pulsed signal is a 32 KHz signal with a 25% duty cycle.

12. The electromechanical/solid-state alternating-current (AC) relay of claim 4 wherein the control circuit generates the de-activating signal to the triac 20 milliseconds after driving the activating signal to the triac, whereby the triac is pulsed on for 20 milliseconds.

13. A circuit-implemented method for operating an electromechanical/solid-state AC relay comprising:

monitoring an alternating-current (AC) input and activating a zero-crossing signal when the AC input changes current direction;

detecting a control signal switching from a turn-off state generating a next zero-crossing signal using a resistor and capacitor connected in series between the AC input and an AC common; into a turn-on state;

when a next zero-crossing signal is activated after the control signal switches into the turn-on state, using a control circuit to activate a triac signal and a relay signal;

immediately activating a triac to conduct current between the AC input and an AC output by applying the triac signal to a gate of the triac, wherein the triac conducts to reduce a voltage difference between the AC output and the AC input to less than one volt;

applying the relay signal to a driver circuit that drives current through a coil to produce an electromagnetic force that moves an armature that forces mechanical contacts to touch and conduct after a mechanical-response period of time;

wherein the mechanical contacts conduct current between the AC input and the AC output after the triac has reduced the voltage difference between the AC input and AC output to less than one volt; and de-activating the triac to stop conducting current between the AC input and the AC output after the mechanical-response period of time has elapsed;

whereby damaging electrical sparks between the mechanical contacts just before making contact are reduced by first activating the triac to reduce the voltage difference between the AC input and AC output to less than one volt.

14. The circuit-implemented method of claim 13 further comprising:

pulsing the relay signal on and off after the triac has been de-activated to maintain contact between the mechanical contacts, whereby power is reduced by pulsing the relay signal.

15. The circuit-implemented method of claim 13 further comprising:

when the control signal switches into the turn-off state, activating the triac signal and de-activating the relay signal;

immediately activating the triac to conduct current between the AC input and an AC output by applying the triac signal to a gate of the triac, wherein the triac conducts to maintain the voltage difference between the AC output and the AC input to less than one volt;

applying the relay signal in a de-activated state to the driver circuit to cause the driver circuit to stop driving current through the coil to eliminate the electromagnetic force, wherein the armature forces the mechanical contacts to move apart and stop conducting after the mechanical-response period of time;

de-activating the triac to stop conducting current between the AC input and the AC output after the mechanical-response period of time has elapsed;

whereby damaging electrical sparks between the mechanical contacts just after moving apart are reduced by first activating the triac to maintain the voltage difference between the AC input and AC output to less than one volt.

16. A high-reliability alternating-current relay comprising:

an alternating-current input;

an alternating-current output;

a control input;

mechanical contact means for conducting current between the alternating-current input and the alternating-current output when in a closed position, and for isolating the alternating-current input from the alternating-current output when in an open position;

electromechanical contact means for mechanically moving the mechanical contact means into the closed position in response to a relay signal being activated, and for moving the mechanical contacts into the open position in response to the relay signal not being activated;

triac means for conducting alternating current between the alternating-current input and the alternating-current output in response to a gate signal being activated;

zero-sampling means for detecting a direction change of alternating current from the alternating-current input;

wherein the zero-sampling means comprises: a zero-detect capacitor coupled between the alternating-current input and a zero crossing signal input; and a zero-detect resistor coupled between the zero-crossing signal input and an alternating-current common; control means, coupled to the zero-crossing signal input, for generating the gate signal to activate the triac means in response to the zero-sampling means detecting the direction change after the control input switches to a closed state, and for generating the relay signal to activate the electromechanical contact means to move the mechanical contact means into the closed position;

wherein the triac means conducts before the mechanical contact means begins to conduct to prevent arcing on the mechanical contact means; and triac disable means for disabling the gate signal to disable the triac means from conducting after a fixed period of time of conduction by the triac means, wherein the triac means is disabled after the mechanical contact means begins to conduct the alternating current.

17. The high-reliability alternating-current relay of claim 16 further comprising:

optoelectronic-coupler means for optically coupling the control input to the control means, and for electronically isolating the control input from the control means.

18. The high-reliability alternating-current relay of claim 16 further comprising:

pulsing means for pulsing the relay signal on and off after the mechanical contact means begins conducting the alternating current.

19. The high-reliability alternating-current relay of claim 16 further comprising:

control-off means for generating the gate signal to activate the triac means in response to the control input switching to an open state, and for generating the relay signal to activate the electromechanical contact means to move the mechanical contact means into the open position, whereby the triac means is pulsed on for the fixed period of time during switching of the mechanical contact means into the open position.

* * * * *